Figure 1:
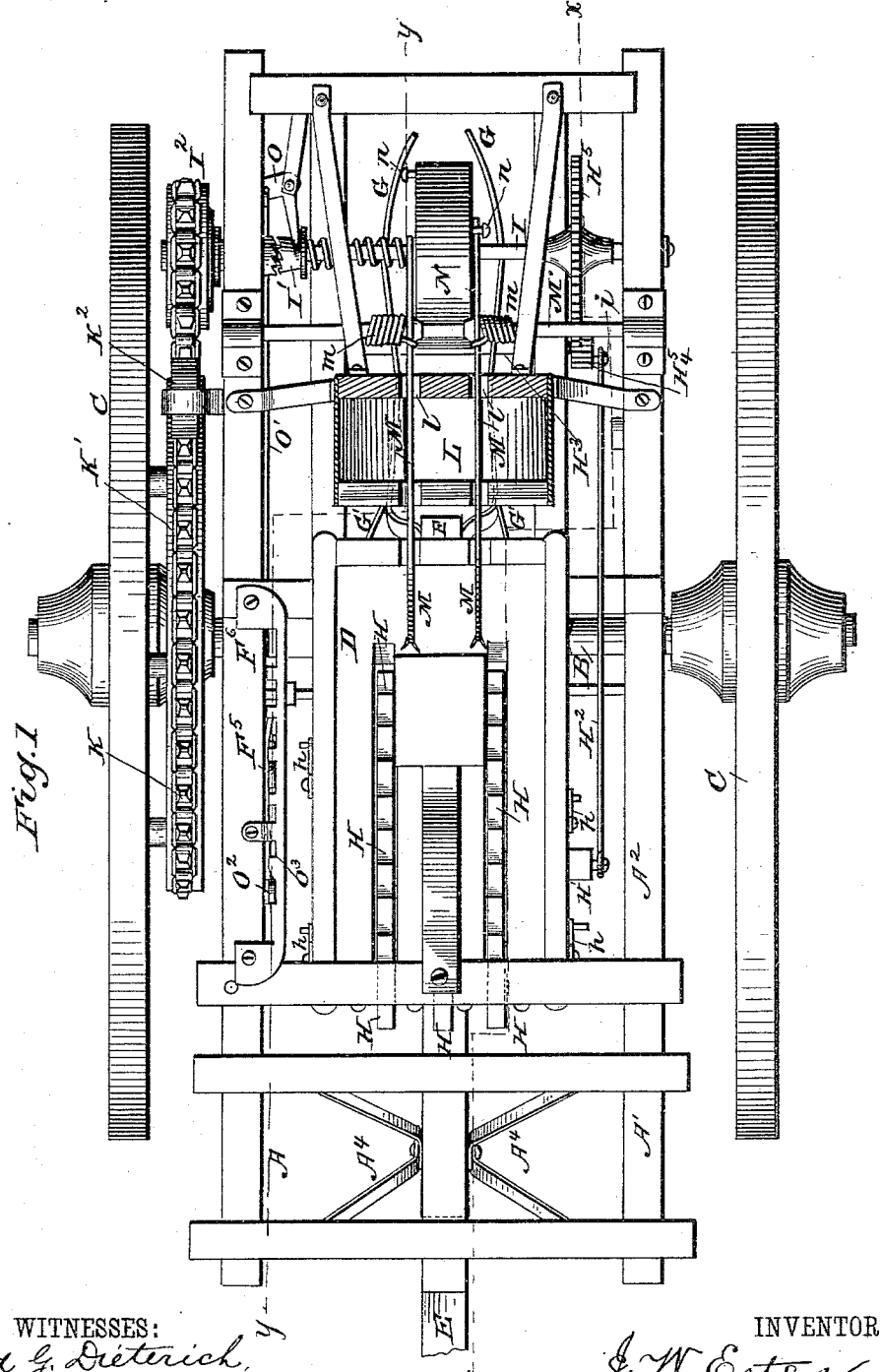

(No Model.) 3 Sheets—Sheet 1.

J. W. ESTES.
POTATO PLANTER.

No. 384,353. Patented June 12, 1888.

WITNESSES:
Fred G. Dieterich
Geo. C. Kernon

INVENTOR:
J. W. Estes
BY Munn & Co
ATTORNEYS.

(No Model.)  3 Sheets—Sheet 2.
J. W. ESTES.
POTATO PLANTER.
No. 384,353.  Patented June 12, 1888.
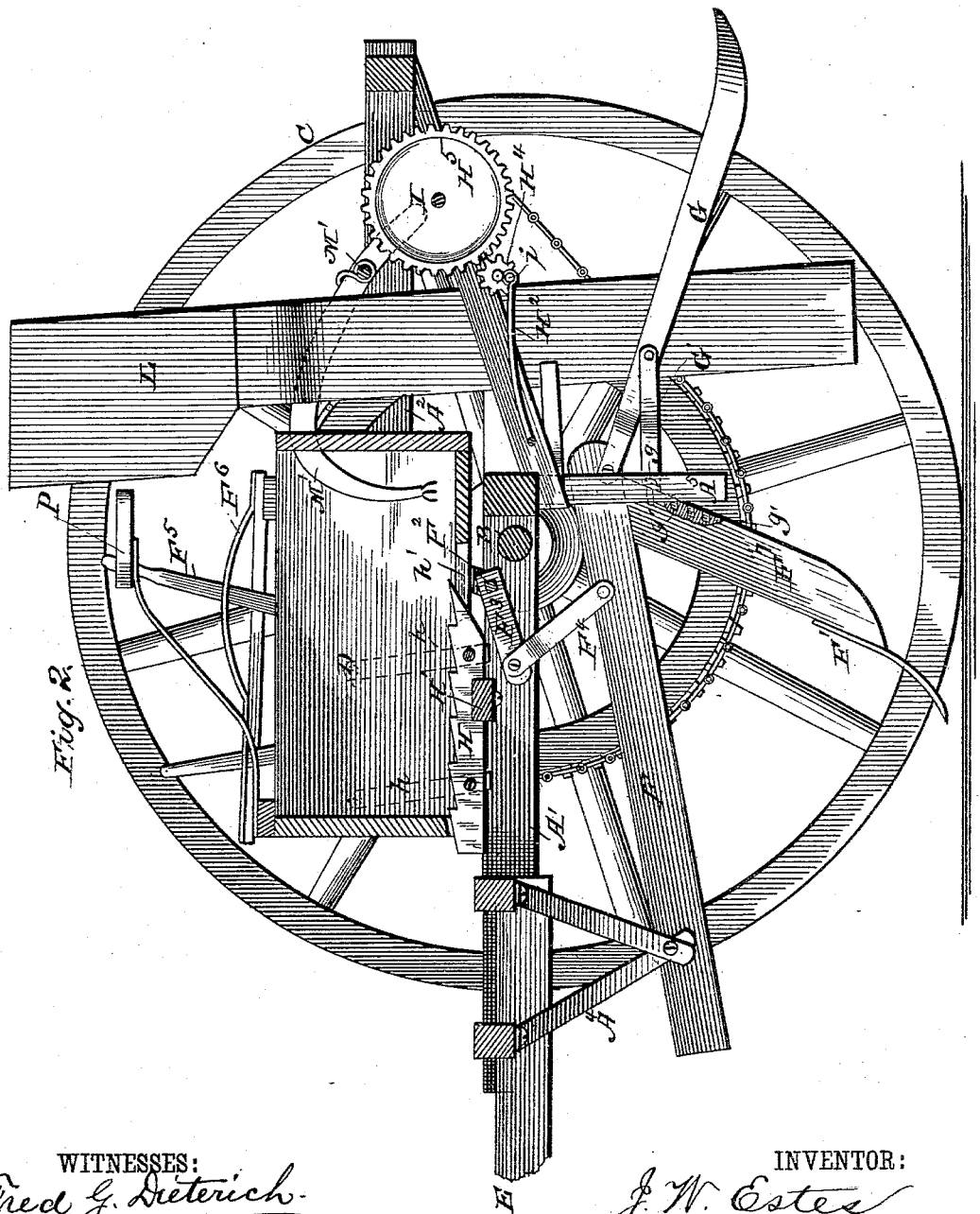
WITNESSES:
Fred G. Dieterich
[signature]
INVENTOR:
J. W. Estes
BY Munn & Co.
ATTORNEYS.

(No Model.) 3 Sheets—Sheet 3.
J. W. ESTES.
POTATO PLANTER.
No. 384,353. Patented June 12, 1888.
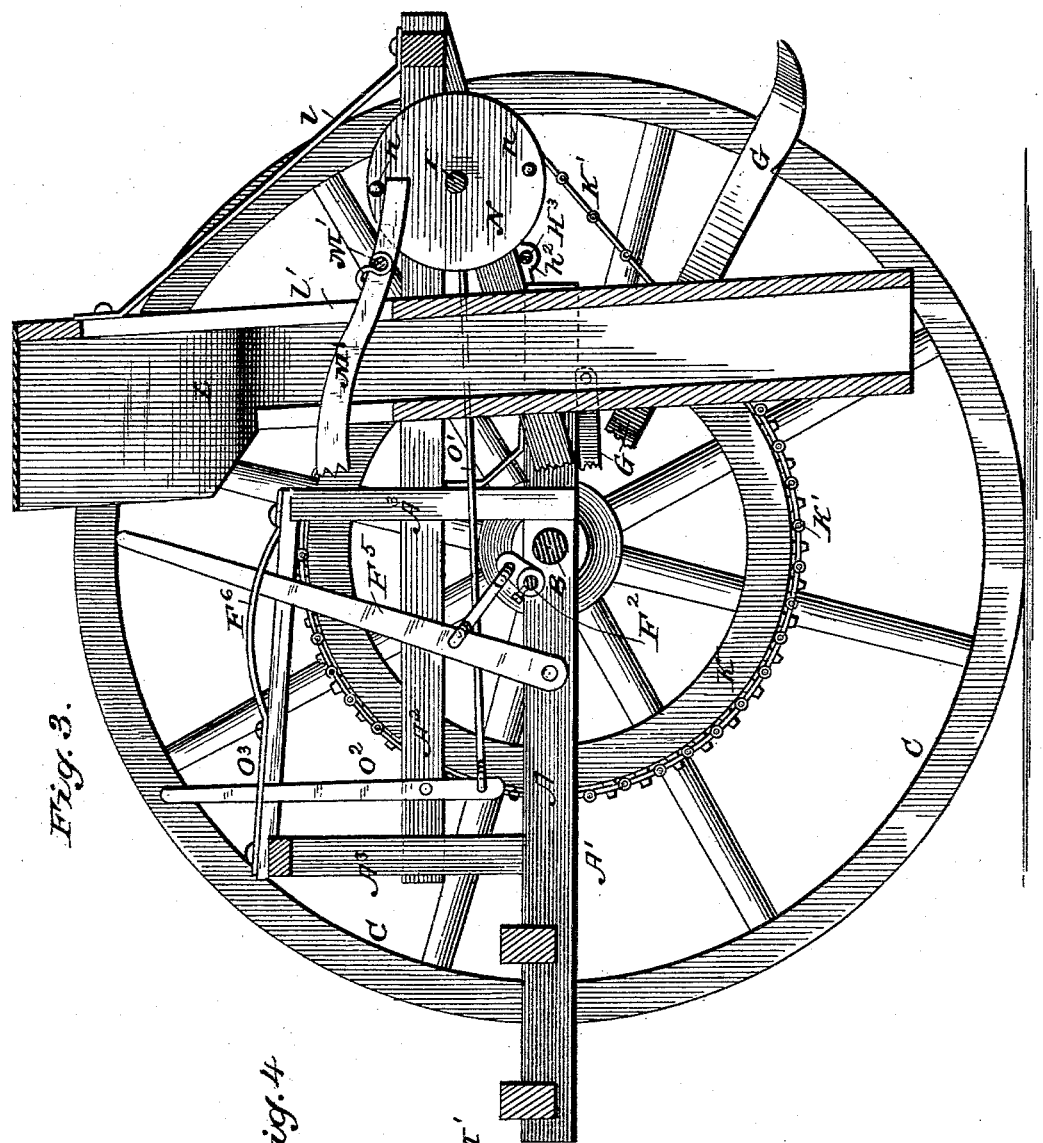
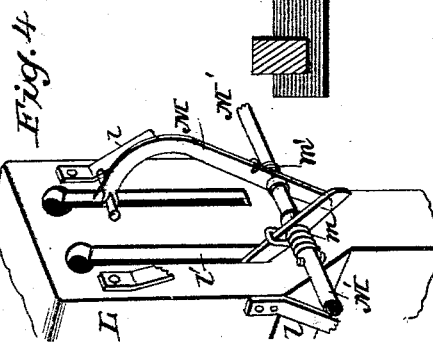
WITNESSES:
Fred G. Dieterich
John C. Kenon
INVENTOR:
J. W. Estes
BY Munn & Co
ATTORNEYS.

UNITED STATES PATENT OFFICE.

JAMES WILLIAM ESTES, OF EAST ATCHISON, MISSOURI.

POTATO-PLANTER.

SPECIFICATION forming part of Letters Patent No. 384,353, dated June 12, 1888.

Application filed September 28, 1887. Serial No. 250,956. (No model.)

*To all whom it may concern:*

Be it known that I, JAMES WILLIAM ESTES, of East Atchison, in the county of Buchanan and State of Missouri, have invented a new and useful Improvement in Potato-Planters, of which the following is a specification.

My invention relates to a potato-planter supported upon a wheel carriage and embodying in its construction an adjustable furrow-opener, adjustable covering-blades, distributing-arms arranged to reciprocate within a hopper, vibrating fingers adapted to pick the potatoes from the hopper and deposit them within a vertical tube arranged in rear of the hopper, and of the forward opening-shovel.

My invention consists in certain constructions and combinations of parts hereinafter particularly described and claimed.

In the accompanying drawings, Figure 1 is a plan of my improved machine with the upper part of the seed-depositing tube in section; Fig. 2, a vertical sectional elevation in the line $xx$ of Fig. 1; Fig. 3, a vertical section in line $yy$ of Fig. 1, and Fig. 4 is a detail of a means for holding one of the fingers out of gear.

The carriage-frame A is supported upon an axle, B, and wheels C, and consists of two parallel rectangular frame-sections, A' A², connected by vertical posts A³, the lower frame resting upon the axle, and the upper frame embracing the hopper D and supporting the gearing at the rear end thereof. A guide-pole, E, projects forwardly from the frame and is supported by the team, and a beam, F, to which the furrow-opener shovel F' is attached, is pivotally supported upon hangers A⁴, depending from the forward end of the lower frame-section, A', and guided at its rear end between posts A⁵, depending from said lower frame-section in rear of the axle. A rock-shaft, F², carrying an arm, F³, is connected with the rear end of the beam F by a link, F⁴, and is moved and adjusted by a hand-lever, F⁵, and rack-bar F⁶, secured to the frame. By this means the furrow-opener shovel may be raised or lowered to work at any required depth, or elevated a suitable distance above the ground when the machine is moved from place to place.

Covering-blades G are pivoted to the rear end of the beam F, and are adjusted at any required angle by a stirrup-brace, G', pivoted at its forward ends to the said blades, and secured to the standards F⁷ of the beam at any required height by a screw-bolt, $g$, fitting in any one of a series of holes, $g'$, in said shovel-standards.

A series of serrated arms, H, secured to a cross-head, H', and suspended by links $h$, pivoted to the hopper, pass up through longitudinal slots $h'$ in the bottom of the hopper, and are reciprocated therein with a rising-and-falling movement to distribute the potatoes evenly within the hopper. The cross-head H' of the distributing-arms is moved or oscillated by a pitman, H², driven from a crank, $i$, upon the shaft H³, supported in bearings $h^2$ upon the frame, and connected by gear-pinion H⁴ and spur-gear H⁵, fitted upon the main driving-shaft geared to and driven by the wheel. The shaft I is fitted with a clutch, I', and keyed to the shaft to slide thereon, and with a sprocket-wheel, I², to engage therewith for connecting and disconnecting the said shaft and sprocket-wheel.

A sprocket-wheel, K, upon the axle B carries a chain, K', which passes under an idler-roller, K², supported upon the upper frame-section, A', and also passes around the sprocket-wheel I², by which means the shaft I is driven by the forward movement of the planter.

An upright dropper-tube, L, secured by brace-rods $l$ to the frame, is secured at the rear end of the hopper D, and vibratory fingers M, supported to oscillate upon a fixed shaft, M', secured at its ends to the frame, pass through vertical apertures $l'$ in the tube and in the rear end of the hopper, and at each vibratory movement will each puncture a potato and lift it out of the hopper above and across the upper end of the inner wall of and into the upright dropper-tube L until the potato is intercepted by the walls of the slot and thereby pulled from the ends of the fingers and allowed to drop through the tube to the ground between the opening-shovel and covering-blades. Springs $m$ $m'$, coiled upon the shaft M', and fixed at its ends to the said fingers and shaft, serve to hold the fingers down in the hopper, when not otherwise acted upon, and a tripping-wheel, N, secured to the continuously-revolving shaft I, and having studs $n$ $n$ projecting from its faces, engage with the ends of the fingers M and raise them from the hopper to carry the potato to the upright tube, as hereinbefore described.

When one only of the fingers is to be used, the other finger or fingers, when more than two are employed, are propped up and held out of engagment with the tripping-wheel by placing a pin between the branching points of the fingers to cross the apertures $l'$, as shown by detail in Fig. 4.

A bell-crank lever, O, pivoted to the frame and engaging with the clutch I' of the main driving-shaft, is connected by a rod, $o'$, with a hand-lever, $o^2$, pivoted to the frame and held in any required position to hold the clutch into or out of gear with the sprocket-wheel by a rack-segment, $o^3$, of well-known construction.

The machine herein described is simple in construction and effective in operation, and potatoes of any required size may be planted with equal facility.

The number of hills to be planted is regulated by the size of the machine and the number of fingers employed, and the distance between the hills is regulated by the size of the sprocket-wheels upon the axle and main driving-shaft. Various-sized pinions may be adapted to each machine for the purpose named.

A driver's seat, P, is secured to the frame, which will be out of the way of the moving parts of the machine.

I claim as my invention and desire to secure by Letters Patent—

1. In a planter, the combination, with the supporting-frame, of the beam carrying at its rear end the shovel-standard and pivotally suspended at its forward end from said frame, said beam being vertically adjustable at its rear end and carrying a rearwardly-projecting pivoted coverer, which coverer is provided with a pivoted stirrup having an adjustable connection with said shovel-standard, substantially as set forth.

2. In a planter, the combination, with the shovel-standard-carrying beam, of the pivoted covering-blade provided with a pivoted stirrup having an adjusting-screw and aperture-connection with the shovel-standard, substantially as set forth.

3. In a planter, the combination, with the hopper and dropper-tube, of the vibrating fingers secured upon a shaft and passing through slots in said tube, and springs applied to said shaft and fingers, said fingers having their inner ends adapted to receive a pin placed against said tube and crosswise of said slots to effect the holding of any one or more of said fingers out of operation, substantially as set forth.

JAMES WILLIAM ESTES.

Witnesses:
W. S. CONNOR,
J. P. FUNDERBURK.